United States Patent
Kim et al.

(10) Patent No.: US 11,639,119 B2
(45) Date of Patent: May 2, 2023

(54) SEAT RAIL FOR VEHICLE

(71) Applicants: HYUNDAI MOTOR COMPANY, Seoul (KR); KIA CORPORATION, Seoul (KR); NIFCO KOREA INC., Asan-si (KR); Hyundai Transys Inc., Seosan-si (KR)

(72) Inventors: Eun Sue Kim, Hwaseong-si (KR); Seung Sik Han, Hwaseong-si (KR); Hong Heui Lee, Suwon-si (KR); Myung Hoe Kim, Seoul (KR); Jin Kim, Asan-si (KR); Gyong Min Kim, Hwaseong-si (KR); In Gul Baek, Hwaseong-si (KR); Soo Young Chae, Yongin-si (KR); Hoe Won Jeong, Asan-si (KR); Jin Wook Choi, Hwaseong-si (KR)

(73) Assignees: HYUNDAI MOTOR COMPANY, Seoul (KR); KIA CORPORATION, Seoul (KR); NIFCO KOREA INC., Asan-si (KR); Hyundai Transys Inc., Seosan-si (KR)

( * ) Notice: Subject to any disclaimer, the term of this patent is extended or adjusted under 35 U.S.C. 154(b) by 0 days.

(21) Appl. No.: 17/338,899

(22) Filed: Jun. 4, 2021

(65) Prior Publication Data
US 2022/0134911 A1     May 5, 2022

(30) Foreign Application Priority Data
Nov. 4, 2020 (KR) .......................... 10-2020-0146023

(51) Int. Cl.
*B60N 2/07* (2006.01)

(52) U.S. Cl.
CPC .................................. *B60N 2/0725* (2013.01)

(58) Field of Classification Search
CPC ...... B60N 2/07; B60N 2/0702; B60N 2/0707; B60N 2/071; B60N 2/0722; B60N 2/0725; B60R 16/03
See application file for complete search history.

(56) References Cited

U.S. PATENT DOCUMENTS

| | | | | |
|---|---|---|---|---|
| 2,107,997 A | * | 2/1938 | Horsley | ................. A45C 13/16 312/297 |
| 3,870,391 A | * | 3/1975 | Nims | ...................... E06B 9/115 312/297 |
| 3,964,802 A | * | 6/1976 | Pitner | ................. F16C 33/4688 384/44 |
| 4,162,024 A | * | 7/1979 | Shanley | ................. B65D 43/20 217/62 |

(Continued)

FOREIGN PATENT DOCUMENTS

| | | | | |
|---|---|---|---|---|
| KR | 20100120768 A | * | 11/2010 | ............... B60N 2/07 |
| KR | 10-2012-0004206 A | | 1/2012 | |

*Primary Examiner* — Muhammad Ijaz
*Assistant Examiner* — Guang H Guan
(74) *Attorney, Agent, or Firm* — Lempia Summerfield Katz LLC

(57) ABSTRACT

A seat rail for a vehicle includes: a rail gap cover combined with a moving rail, and a slit cover combined with the rail gap cover to close the gap between a fixed rail and the moving rail regardless of movement of the moving rail, whereby it is possible to prevent foreign substances from entering into the fixed rail.

16 Claims, 9 Drawing Sheets

(56) References Cited

U.S. PATENT DOCUMENTS

| | | | | |
|---|---|---|---|---|
| 4,461,518 A * | 7/1984 | Tanaka | ................ | F16C 29/0619 384/44 |
| 4,475,701 A * | 10/1984 | Martin | ................ | B60P 7/0815 244/118.6 |
| 4,756,581 A * | 7/1988 | Phillips | ................ | B42F 17/10 312/348.3 |
| 4,941,570 A * | 7/1990 | Kruger | ................ | B25H 3/003 220/350 |
| 5,805,535 A * | 9/1998 | Guyard | ................ | G04B 37/0033 368/282 |
| 5,975,329 A * | 11/1999 | Schmitt | ................ | A47K 10/3827 220/350 |
| 6,145,911 A * | 11/2000 | Sturt | ................ | B60N 3/042 296/65.01 |
| 6,427,962 B1 * | 8/2002 | Rohee | ................ | B60N 2/0705 248/424 |
| 7,073,764 B2 * | 7/2006 | Matsushiro | ................ | B60N 2/0725 296/65.13 |
| 7,182,292 B2 * | 2/2007 | Howard | ................ | B64D 11/0696 244/118.6 |
| 7,399,149 B2 * | 7/2008 | Kinoshita | ................ | B60N 2/0705 410/115 |
| 7,467,895 B2 * | 12/2008 | Kurachi | ................ | F16C 29/065 384/43 |
| 7,578,620 B2 * | 8/2009 | Kato | ................ | F16C 33/3706 384/44 |
| 7,814,637 B2 * | 10/2010 | Terada | ................ | B60R 16/0215 29/748 |
| 8,014,134 B2 * | 9/2011 | Liu | ................ | G06F 1/1626 361/679.01 |
| 8,220,203 B2 * | 7/2012 | Gase | ................ | B60R 13/0243 160/230 |
| 9,308,833 B2 * | 4/2016 | Sekino | ................ | B60N 2/071 |
| 9,522,614 B2 * | 12/2016 | Clark | ................ | B60N 2/0725 |
| 9,573,536 B2 * | 2/2017 | Katou | ................ | B60N 2/06 |
| 10,214,168 B1 * | 2/2019 | Yamamoto | ................ | H02G 11/006 |
| 10,829,007 B2 * | 11/2020 | Kapusky | ................ | B60N 2/0732 |
| 10,882,567 B2 * | 1/2021 | Schulz | ................ | B64C 1/18 |
| 10,994,637 B2 * | 5/2021 | Ogasawara | ................ | B60N 2/067 |
| 11,067,125 B2 * | 7/2021 | Tseng | ................ | F16C 33/6681 |
| 11,203,308 B2 * | 12/2021 | Yamamoto | ................ | B60N 2/0722 |
| 11,267,369 B2 * | 3/2022 | Yamada | ................ | B60N 2/0715 |
| 11,305,707 B2 * | 4/2022 | Lee | ................ | B60R 13/06 |
| 2021/0394647 A1 * | 12/2021 | Shim | ................ | B60N 2/0232 |
| 2022/0134911 A1 * | 5/2022 | Kim | ................ | B60R 16/03 248/429 |

* cited by examiner

SEAT RAIL FOR VEHICLE

CROSS REFERENCE TO RELATED APPLICATION

This application claims priority to and the benefit of Korean Patent Application No. 10-2020-0146023, filed on Nov. 4, 2020, the entire contents of which are incorporated herein by reference.

FIELD

The present disclosure relates to a seat rail for a vehicle.

BACKGROUND

The statements in this section merely provide background information related to the present disclosure and may not constitute prior art.

In general, automotive seats are installed to be able to slide forward and backward on seat rails.

The fundamental configuration of a seat rail is composed of a fixed rail elongated and fixed on the floor panel in the front-rear direction in a vehicle and a moving rail combined with the fixed rail to move forward and backward along the fixed rail, and combined with a seat in a vehicle.

Since the moving rail is moved by a motor, it is called a power seat or an electric seat. As for a power seat, several gears (a pinion gear, a rack gear, etc.) for moving the moving rail may be installed in the fixed rail.

The fixed rail has a gap formed like a slit in the front-rear direction and the moving rail is inserted in the gap and moving forward and backward along the fixed rail. We have discovered that there is a disadvantage that foreign substances enter the fixed rail through the gap between the fixed rail and the moving rail and causes breakdown of the seat rail.

Even if the gap of the fixed rail is covered with a carpet covering the floor panel in a vehicle, there is a need for a slit-shaped gap in the carpet in the front-rear direction to move the moving rail. Accordingly, there is still the problem that foreign substances enter the fixed rail through the gap of the carpet.

In particular, we have found that since the seat rails applied to the second seats or the third seats of Sport Utility Vehicles (SUV) or Multi Purpose Vehicles (MPV) are longer than those of the seat rails of common cars, the section in which a gap exists between a fixed rail and a moving rail is longer in a long rail than common seat rails, and thus there is a problem that the amount of foreign substances entering the fixed rail correspondingly increases.

The description provided above as a related art of the present disclosure is just for helping understanding the background of the present disclosure and should not be construed as being included in the related art known by those skilled in the art.

SUMMARY

The present disclosure provides a seat rail for a vehicle that can inhibit or prevent foreign substances from entering a fixed rail by closing the gap between a fixed rail and a moving rail so that durability and the commercial value can be improved.

In one form of the present disclosure, a seat rail for a vehicle includes: a fixed rail having a rail slit elongated along a longitudinal direction of the fixed rail; a moving rail having a lower end, which is inserted in the fixed rail through the rail slit, and moving forward and backward along the rail slit; a guide bracket coupled to cover the fixed rail and having a bracket slit elongated along a longitudinal direction of the guide bracket and connected to the rail slit; a rail gap cover combined with the moving rail, fitted in the rail slit and the bracket slit, and moving with the moving rail; and a slit cover combined with the rail gap cover to move with the moving rail and the rail gap cover and supported by the guide bracket to keep closing the bracket slit when moving.

The guide bracket may include a left bracket and a right bracket combined to cover an outer side of the fixed rail except for the rail slit, and the bracket slit that is open upward may be formed by assembly of the left bracket and the right bracket.

Several bracket bosses protruding inward may be formed at a front end and a rear end of the guide bracket, and the bracket bosses may be in contact with front and rear ends of the fixed rail positioned inside the guide bracket, thereby fixing a position of the fixed rail in a front-rear direction of the vehicle.

A guide groove connected in an elliptical track shape may be formed in the guide bracket, and the rail gap cover and the slit cover may be inserted in the guide groove to be able to move along the guide groove.

A guide groove in an elliptical track shape may be formed in the guide bracket, and the guide groove may include an upper groove straightly elongated along the longitudinal direction of the guide bracket and formed at an upper portion of the guide bracket where the bracket slit is formed, a lower groove formed in parallel with the upper groove under the upper groove, and connection grooves formed in arc shapes and including: a front connection groove connecting front ends of the upper groove and the lower groove, and a rear connection groove connecting rear ends of the upper groove and the lower groove.

The rail gap cover may be disposed in the upper guide groove, so the rail gap cover may move forward and backward along only the upper groove.

The slit cover may be disposed in all of the upper groove, the lower groove, and the connection grooves to be guided, so the slit cover may move along the track-shaped guide groove.

Several flange holes formed through left and right sides of the guide bracket may be spaced apart from each other in a longitudinal direction of the guide bracket and rail flanges of the fixed rail may be positioned outside through the flange holes.

The rail gap cover may include a left cover and a right cover that are combined with each other at a left side and a right side to cover a lower portion of the moving rail.

A guide groove connected in an elliptical track shape may be formed in the guide bracket, and a guide protrusion inserted in the guide groove and moving along the guide groove may laterally protrude from left and right sides of the rail gap cover.

Cover flanges protruding left and right may be formed at a lower end of the rail gap cover, and the cover flanges may be in contact with a bottom of the rail slit and may restrict upward movement of the rail gap cover.

Both ends of the slit cover may be fixed to coupling portions protruding in a front-rear direction from a front and a rear of the rail gap cover, whereby the rail gap cover and the slit cover may be connected in an elliptical track shape.

A wiring hole may be formed at the rail gap cover to pass a wiring that is connected to electric parts of a seat.

The slit cover may include: upper covers composed of a curve and several pieces including the curve, disposed in series, exposed through the bracket slit, and covering the bracket slit; cover rubbers coupled to rear sides of the upper covers and connecting the upper covers; and cover hinges coupled to the cover rubbers and protruding left and right, in which both ends of the upper covers connected in series by the cover rubbers may be respectively coupled to front and rear ends of the rail gap cover, whereby the rail gap cover and the slit cover may be connected in an elliptical track shape.

A guide groove connected in an elliptical track shape may be formed in the guide bracket, and both left and right ends of the cover hinges may be inserted in the guide groove and may move along the guide groove.

The upper covers may be made of a hard injection-molded material.

The rail gap cover may be configured to cover left and right gaps between the moving rail and the bracket slit, and the slit cover may be configured to cover the fixed rail and the bracket slit.

According to the seat rail of the present disclosure, the rail gap cover combined with the moving rail is inserted in the bracket slit of the guide bracket and in the rail slit of the fixed rail, and particularly, the slit cover combined with the rail gap cover keeps closing the bracket slit regardless of movement of the moving rail, whereby the gap between the fixed rail and the moving rail can be closed up and removed by the rail gap cover and the slit cover. Accordingly, it is possible to fundamentally prevent foreign substances from entering the fixed rail, so it is possible to improve durability and the commercial value.

Further, even if the guide bracket is covered with a carpet, the gap by the carpet can be closed up by the rail gap cover and the slit cover, so it is possible to prevent foreign substances from entering the fixed rail.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
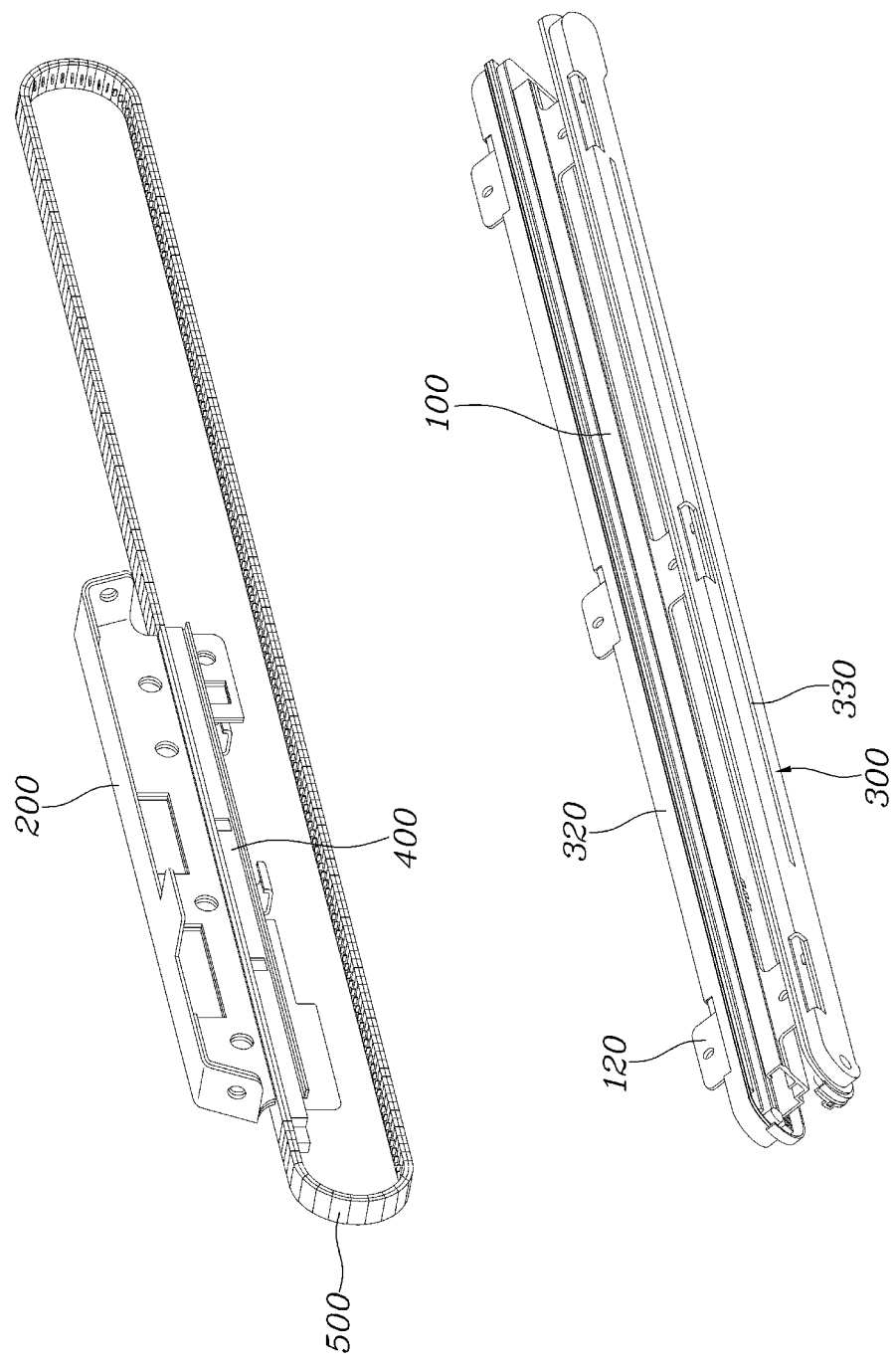
FIG. 1 is an exploded perspective view of a seat rail for a vehicle according to one form of the present disclosure.
Figure 2:
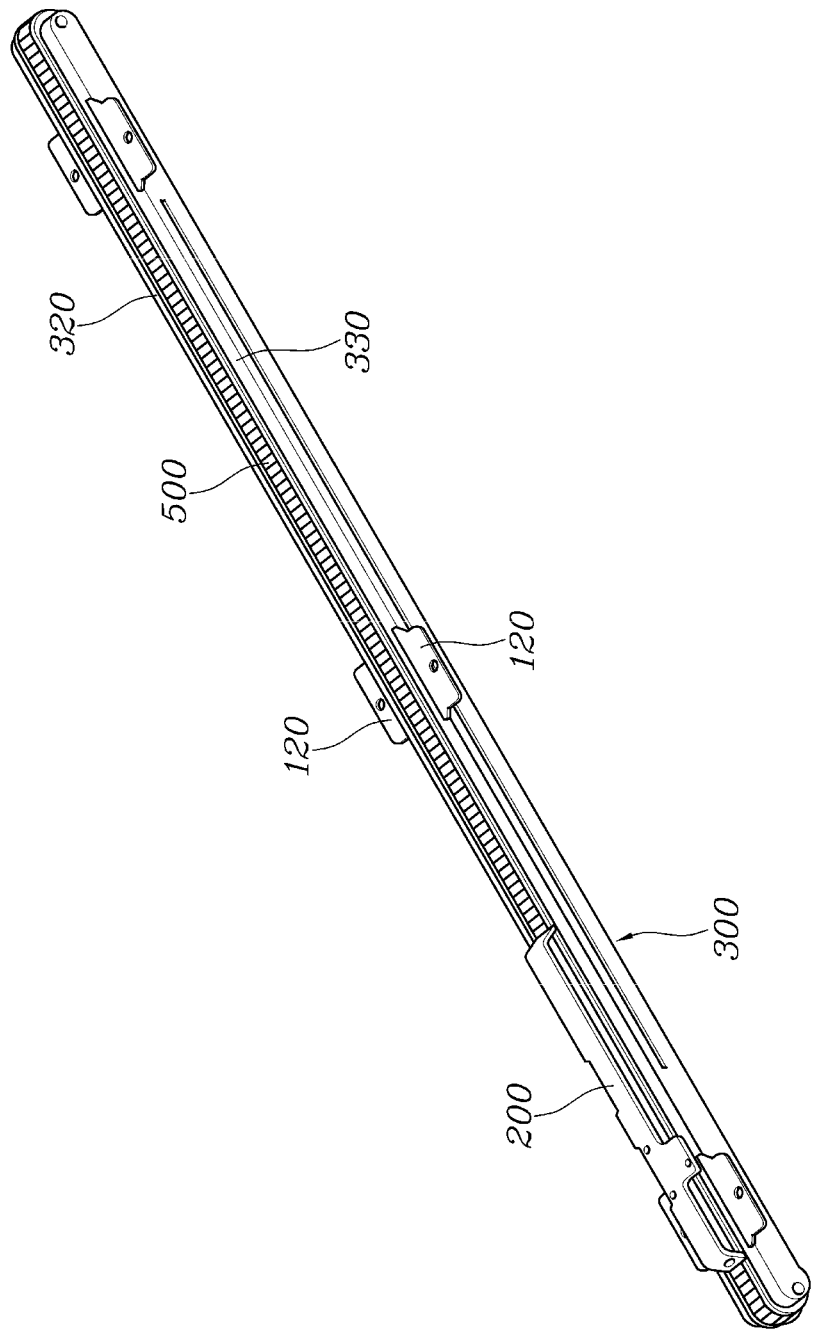
FIG. 2 is view showing the combined state of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, the structural or functional description specified to exemplary forms according to the concept of the present disclosure is intended to describe the exemplary forms, so it should be understood that the present disclosure may be variously embodied, without being limited to the exemplary forms.

The exemplary forms described herein may be changed in various ways and various shapes, so it should be understood that the exemplary forms according to the concept of the present disclosure are not limited to the forms which will be described hereinbelow with reference to the accompanying drawings, but all of modifications, equivalents, and substitutions are included in the scope and spirit of the present disclosure.

It will be understood that, although the terms first, second, etc. may be used herein to describe various elements, but these elements should not be limited by these terms. These terms are only used to distinguish one element, from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

Terms used in the present disclosure are used only in order to describe specific exemplary forms rather than limiting the present disclosure. Singular forms are intended to include plural forms unless the context clearly indicates otherwise. It will be further understood that the terms "comprises" or "have" used in this specification specify the presence of stated features, numerals, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

A control unit (controller) according to exemplary forms of the present disclosure can be implemented through a nonvolatile memory (not shown) configured to store algorithms for controlling operation of various components of a vehicle or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

A seat rail for a vehicle according to exemplary forms of the present disclosure is described hereafter in detail with reference to the accompanying drawings.

In some forms of the present disclosure, a seat rail for a vehicle, as shown in FIGS. 1 to 11, includes: a fixed rail 100 having a rail slit 110 elongated along a longitudinal direction of the fixed rail; a moving rail 200 having a lower end, which is inserted in the fixed rail 100 through the rail slit 110, and moving in forward and backward directions along the rail slit 110; a guide bracket 300 coupled to cover the fixed rail 100 and having a bracket slit 310 elongated along a longitudinal direction of the guide bracket and connected to the rail slit 110; a rail gap cover 400 combined with the moving rail 200, fitted in the rail slit 110 and the bracket slit 310, and moving with the moving rail 200; and a slit cover 500 combined with the rail gap cover 400 to move with the moving rail 200 and the rail gap cover 400 and supported by the guide bracket 300 to keep closing the bracket slit 310 when moving.

The fixed rail 100 is fixed to a floor panel in a front-rear direction of a vehicle.

The rail slit 110 that is open upward and elongated in the longitudinal direction of the fixed rail is formed at the fixed rail 100 and the lower end of the moving rail 200 is inserted in the fixed rail 100 through the rail slit 110. The upper end of the moving rail 200 protrudes upward from the fixed rail 100 to be coupled to a seat in the vehicle.

The guide bracket 300 includes a left bracket 320 and a right bracket 330. The left bracket 320 and the right bracket 330 are combined with each other at the left side and the right side of the fixed rail 100 to cover the fixed rail 100.

The left bracket 320 and the right bracket 330 may be combined with each other by bolts or screws.

When the left bracket 320 and the right bracket 330 are combined with each other to cover the fixed rail 100, they cover the other entire portion of the fixed rail 100 except for the rail slit 110.

When the left bracket 320 and the right bracket 330 are combined with each other to cover the fixed rail 100, the bracket slit 310 being open upward is formed at the guide bracket 300, and the rail slit 110 of the fixed rail 100 is positioned under the bracket slit 310, so the bracket slit 310 and the rail slit 110 are connected up and down.

Several bracket bosses 340 protruding inward are formed at the front end and the rear end of the guide bracket 300 and are in contact with the front and rear ends of the fixed rail 100 positioned inside the guide bracket 300, thereby being able to fix the position of the fixed rail 100 in the front-rear direction.

A guide groove 350 is formed in an elliptical track shape in the guide bracket 300, and the rail gap cover 400 combined with the moving rail 200 and the slit cover 500 combined with the rail gap cover 400 are inserted in the guide groove 350 to be able to move along the guide groove 350.

The guide groove 350 includes an upper groove 351 straightly elongated in the longitudinal direction at the upper portion of the guide bracket 300 where the bracket slit 310 is formed, a lower groove 352 formed in parallel with the upper groove 351 under the upper groove 351, and connection grooves 353 formed in arc shapes to connect the front and rear ends of the upper groove 351 and the lower groove 352. In one form, the connection grooves 353 includes: a front connection groove connecting the front ends of the upper groove and the lower groove, and a rear connection groove connecting the rear ends of the upper groove and the lower groove.

The guide groove 350 of the guide bracket 300 is continuously formed in an elliptical track shape by connection of the upper groove 351, the lower groove 352, and the two connection grooves 353.

The rail gap cover 400 is installed to be guided only in the upper groove 351 of the guide groove 350, so it moves forward and backward along only the upper groove 351.

That is, since the rail gap cover 400 is formed straight, it moves along only the upper groove 351 and cannot move to the connection grooves 353 and the lower groove 352 of the guide groove 350.

On the other hand, the slit cover 500 combined with the rail gap cover 400 is installed to be guided to all of the upper groove 351, the lower groove 352, and the connection grooves 353 of the guide groove 350, so when the moving rail 200 and the rail gap cover 400 move along the upper groove 351 of the guide groove 350, the slit cover 500 can move along the track-shaped guide groove 350.

Several flange holes 360 formed through left and right sides of the guide bracket 300 are spaced apart from each other in the longitudinal direction of the guide bracket 300 and rail flanges 120 of the fixed rail 100 are positioned outside through the flange holes 360. The rail flanges 120 protrude outward from the fixed rail 100 through the flange holes 360 can be fixed to a floor panel.

The rail gap cover 400 includes a left cover 410 and a right cover 420. The left cover 410 and the right cover 420 are combined with each other at the left side and the right side to cover the lower portion of the moving rail 200.

The left cover 410 and the right cover 420 may be combined with each other by bolts or screws.

When the left cover 410 and the right cover 420 are combined with each other, several cover bosses 430 formed on the rail gap cover 400 pass through the lower portion of the moving rail 200, whereby the moving rail 200 and the rail gap cover 400 can be combined with each other.

A guide protrusion 440 laterally protruding is formed on the left and right sides of the rail gap cover 400. The guide protrusions 440 are inserted in the guide groove 350 of the guide bracket 300 to move along the guide groove 350.

The guide protrusions 440 of the rail gap cover 400 are installed to be guided only in the upper groove 351 of the guide groove 350, so the move forward and backward along only the upper groove 351.

Cover flanges 450 protruding left and right are formed at the lower end of the rail gap cover 400. The cover flanges 450 are in contact with the bottom of the rail slit 110 of the fixed rail 100, thereby being able to restrict upward movement of the rail gap cover 400.

Figure 3:
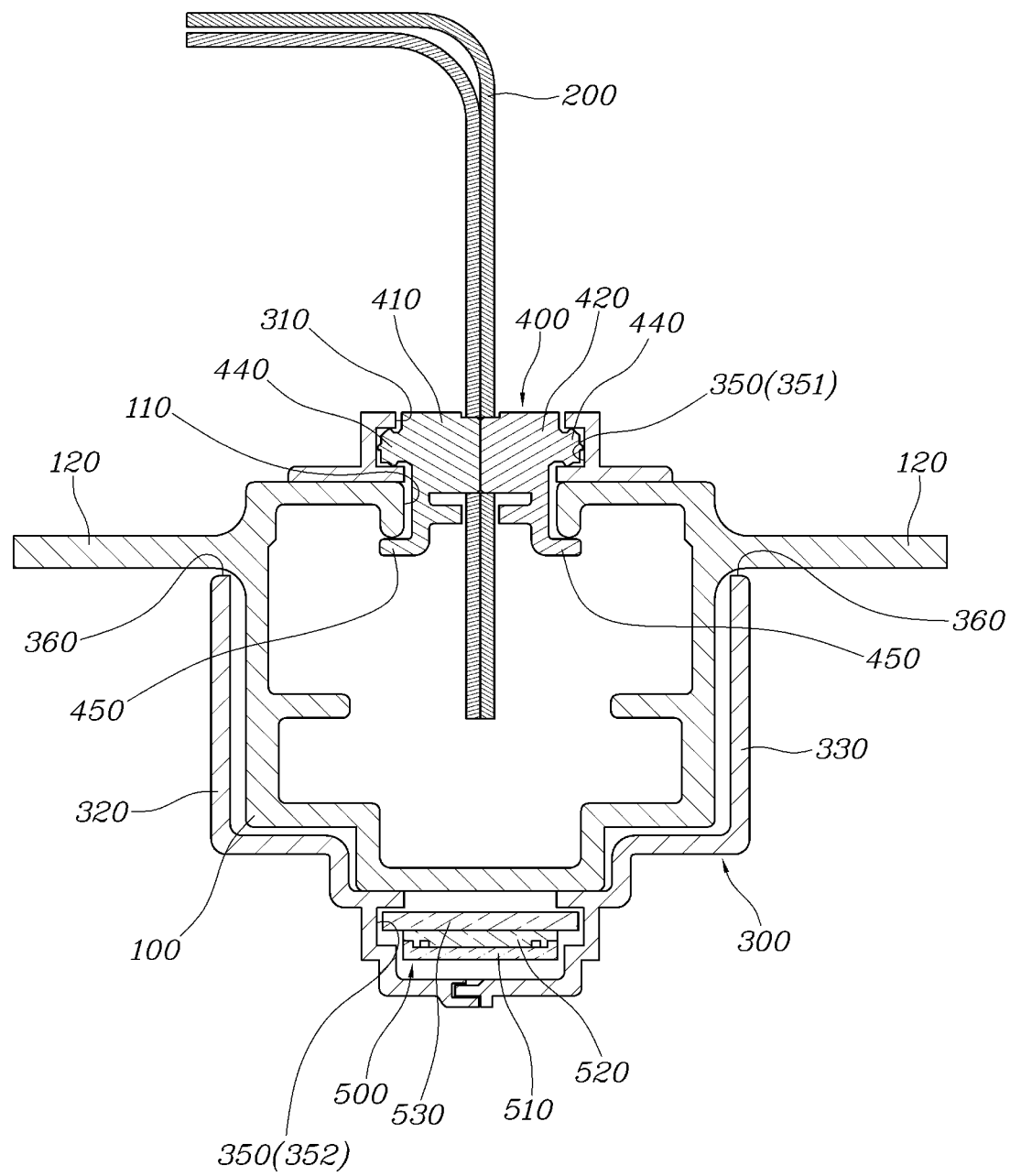
FIG. 3 is a cross-sectional view of FIG. 2.

When the rail gap cover 400 is inserted in both of the bracket slit 310 and the rail slit 110, as shown in FIG. 3, the guide protrusions 440 of the rail gap cover 400 are inserted in the upper groove 351 of the guide groove 350 of the guide bracket 300 and the cover flanges 450 of the rail gap cover 400 pass through the rail slit 110 and then come in contact with the bottom of the rail slit 110.

A coupling portion 460 protruding in the front-rear direction is formed on the front and the rear parts of the rail gap cover 400 and both ends of the slit cover 500 are fixed to the coupling portions 460. Accordingly, the rail gap cover 400 and the slit cover 500 can be connected in an elliptical track shape.

A wiring hole 470 may be formed at the rail gap cover 400 to pass a wiring 600 that is connected to electric parts of a seat.

The slit cover 500 includes: upper covers 510 composed of a curve and several pieces including the curve, disposed in series, exposed through the bracket slit 310, and covering the bracket slit 310; cover rubbers 520 coupled to the rear sides of the upper covers 510 and connecting the upper covers 510; and cover hinges 530 coupled to the cover rubbers 520 and protruding left and right.

Each piece of the upper covers 510 may be formed in a rectangular shape.

Both ends of the upper covers 510 connected in series by the cover rubbers 520 are respectively coupled to the coupling portions 460 on the front and rear ends of the rail gap cover 400, whereby the rail gap cover 400 and the slit cover 500 can be connected in an elliptical track shape.

Both left and right ends of the cover hinges 530 are inserted in the guide groove 350 of the guide bracket 300 to move along the guide groove 350.

When the moving rail 200 and the rail gap cover 400 move along the upper groove 351 of the guide groove 350, the cover hinges 530 of the slit cover 500 can move along the entire guide groove 350 formed in a track shape.

That is, the cover hinges 530 of the slit cover 500 can move along an elliptical track through the upper groove 351, the lower groove 352, and the connection grooves 353 of the guide groove 350.

The upper covers 510 according to one form of the present disclosure are made of a hard injection-molded material to secure strength, but are not limited thereto, and if desired, may be made or a soft rubber material.

The rail gap cover 400 according to another form of the present disclosure is configured to cover the left and right gaps between the moving rail 200 and the bracket slit 310 and the slit cover 500 is configured to cover the fixed rail 100 and the bracket slit 310.

As described above, according to the seat rail of the present disclosure, the rail gap cover 400 combined with the moving rail 200 is inserted in the bracket slit 310 of the guide bracket 300 and in the rail slit 110 of the fixed rail, and particularly, the slit cover 500 combined with the rail gap cover 400 keeps closing the bracket slit 310 regardless of movement of the moving rail 200, whereby the gap between the fixed rail 100 and the moving rail 200 can be closed up and removed by the rail gap cover 400 and the slit cover 500. Accordingly, it is possible to inhibit or prevent foreign substances from entering the fixed rail 100, so it is possible to improve durability and the commercial value.

Figure 4:
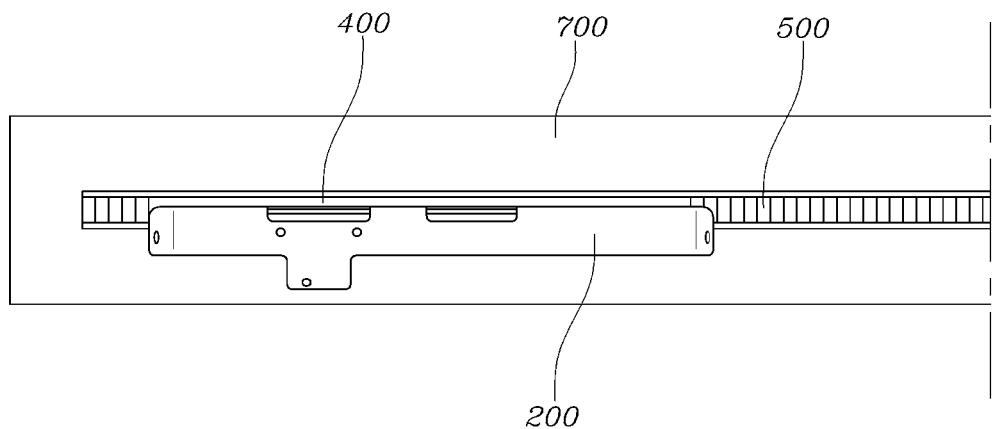
FIG. 4 is a plan view showing the seat rail covered with a carpet.
Figure 5:
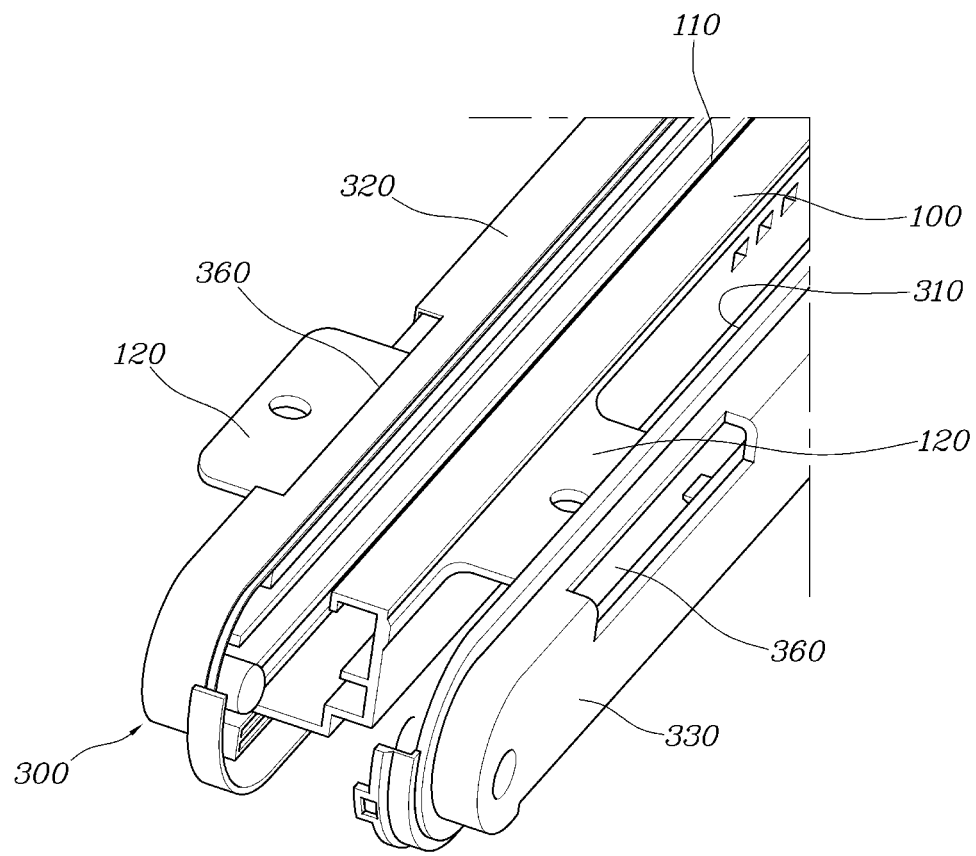
FIG. 5 is a view showing the state in which a fixed rail and a guide bracket are separated.
Figure 6:
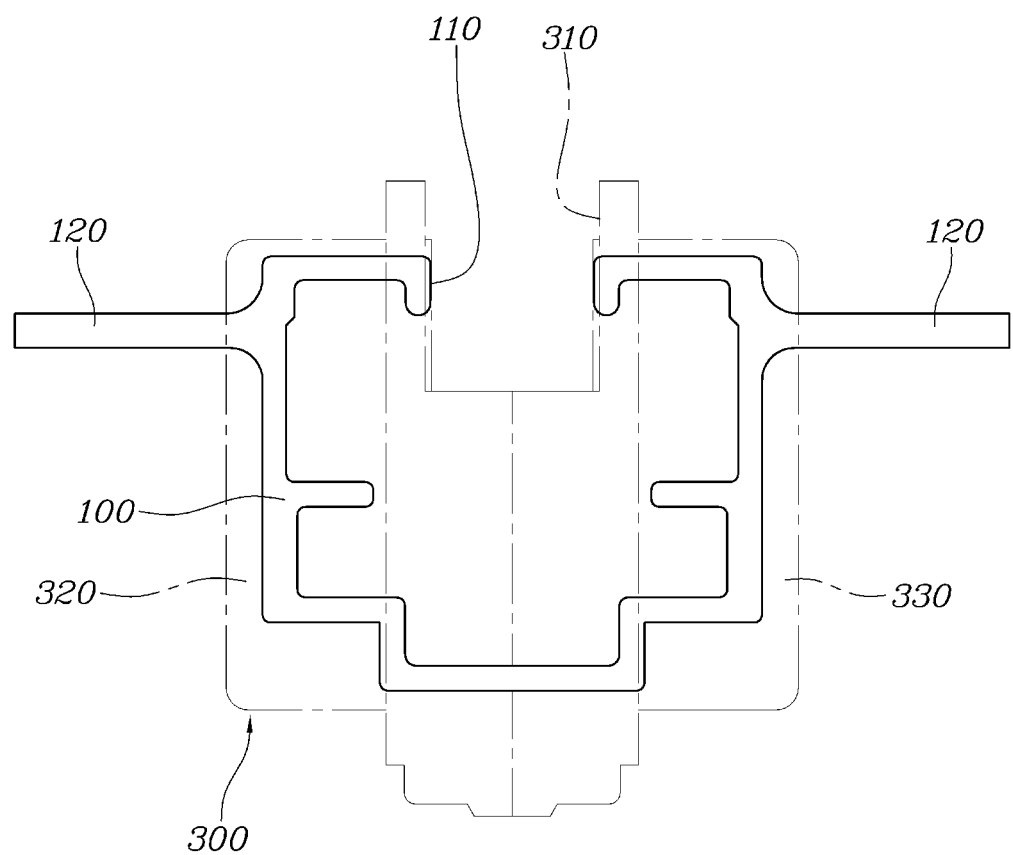
FIG. 6 is a view showing the combined state of FIG. 5.
Figure 7:
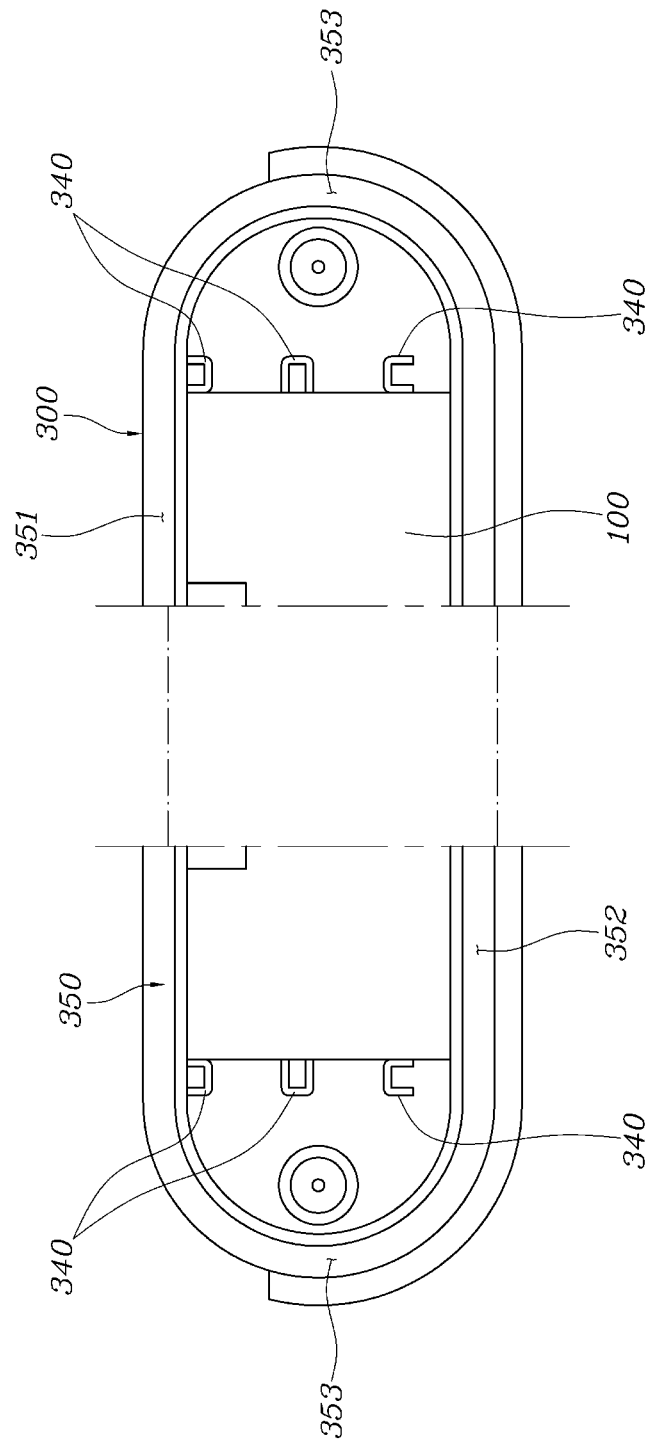
FIG. 7 is a view showing the state in which the fixed rail is fixed to a bracket boss.
Figure 8:
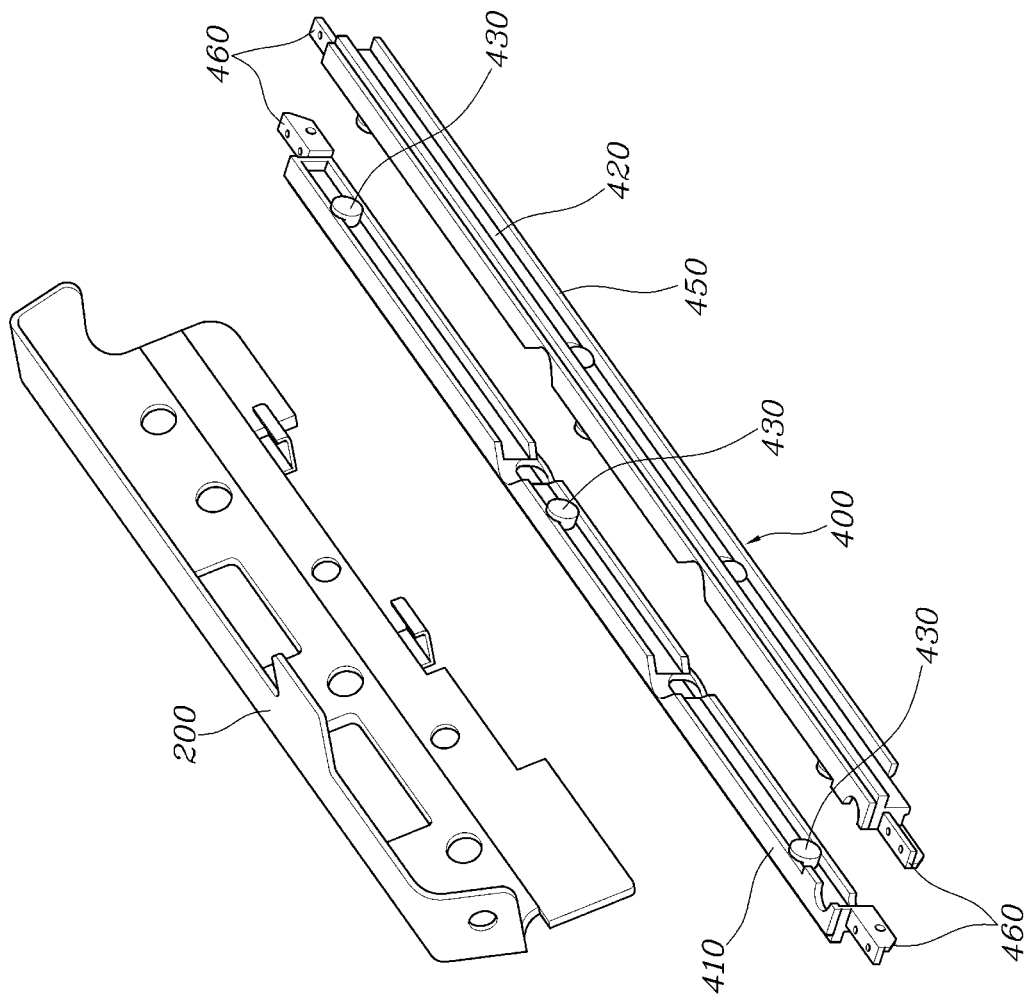
FIG. 8 is an exploded perspective view of a moving rail and a rail gap cover.
Figure 9:
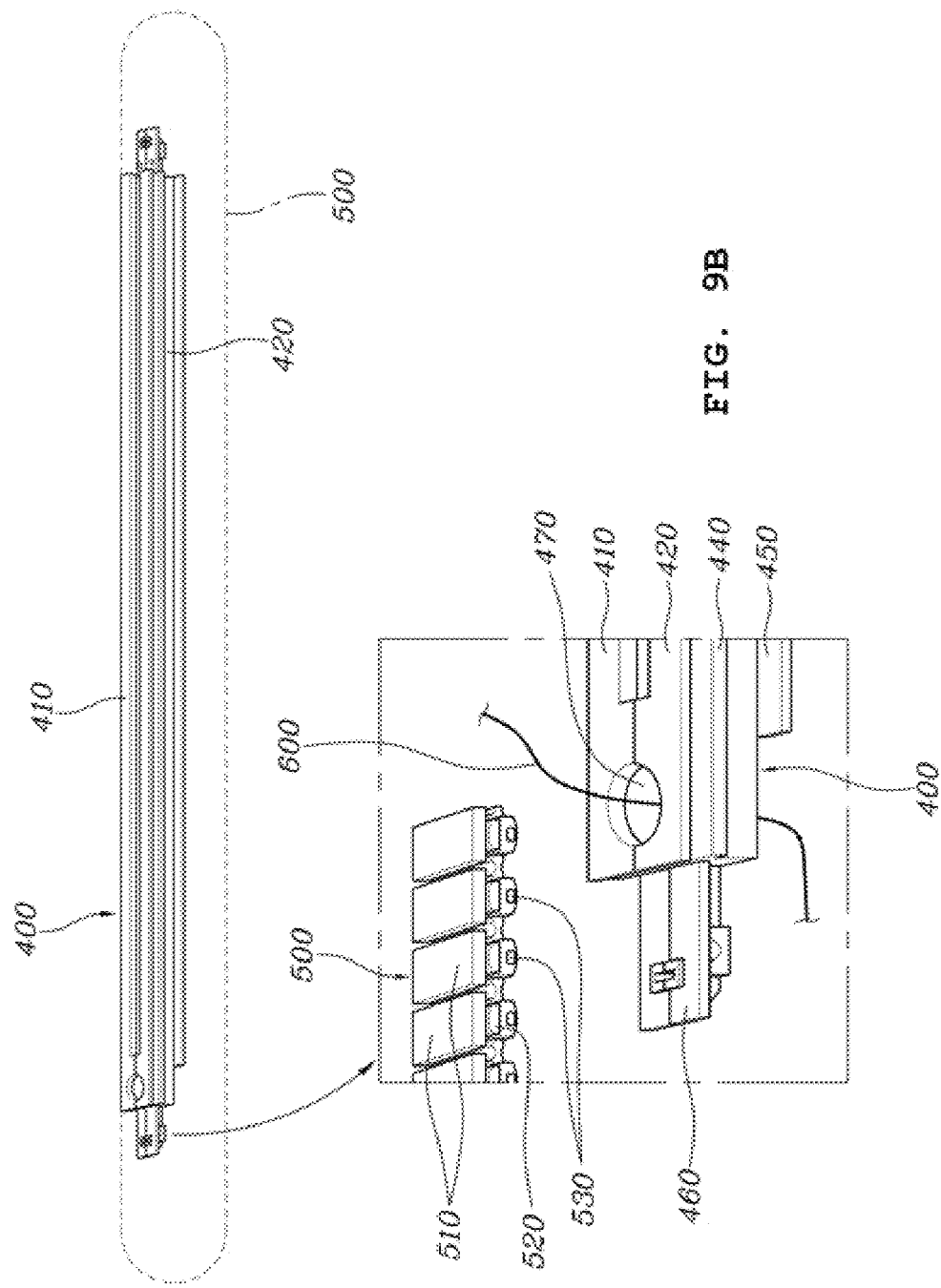
FIGS. 9A, 9B and 10 are views showing a rail gap cover and a slit cover.
Figure 10:
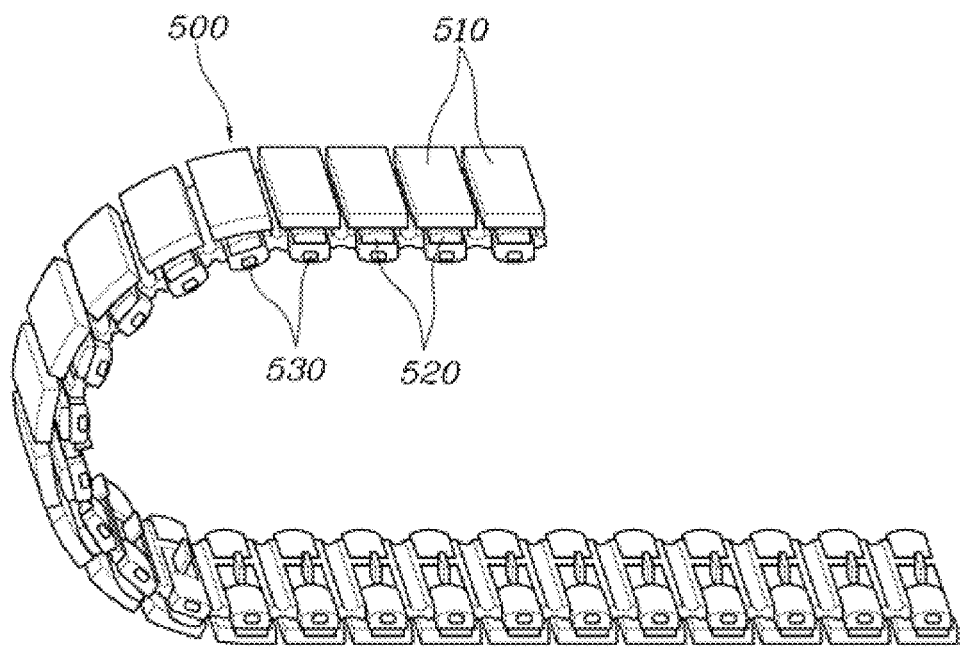
Figure 11:
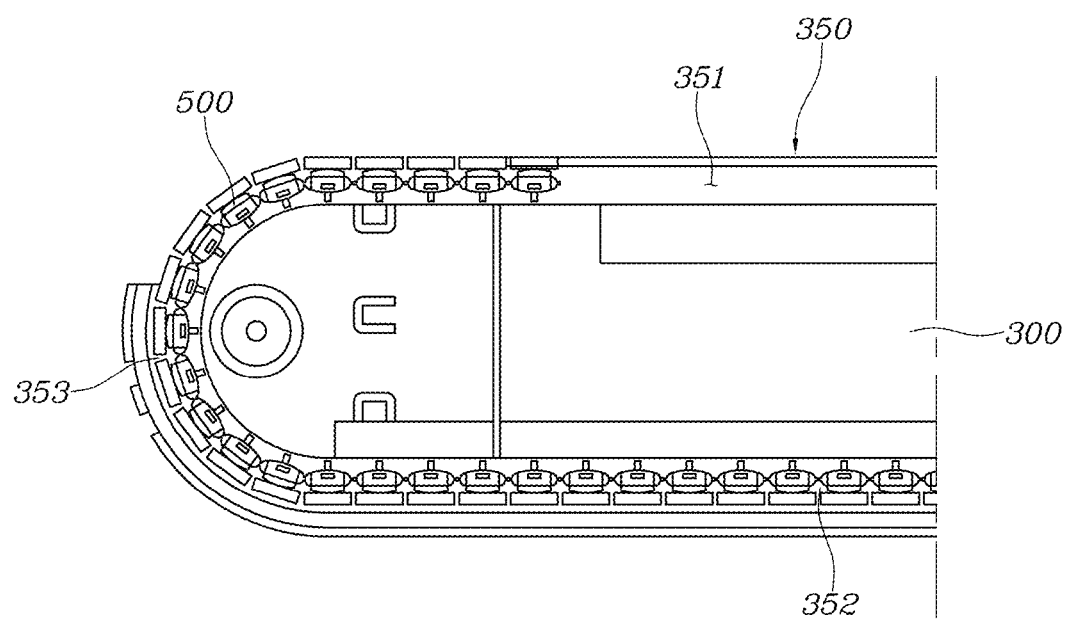
FIG. 11 is a view showing the state in which the slit cover is installed in a guide groove of the guide bracket.

Further, as shown in FIG. 4, even if the guide bracket 300 is covered with a carpet 700, the gap by the carpet 700 can be closed up by the rail gap cover 400 and the slit cover 500, so it is possible to prevent foreign substances from entering the fixed rail 100.

Although the present disclosure was described with reference to the exemplary forms shown in the drawings, it is apparent to those skilled in the art that the present disclosure may be changed and modified in various ways without departing from the scope of the present disclosure.

What is claimed is:

1. A seat rail for a vehicle, comprising:
    a fixed rail having a rail slit elongated along a longitudinal direction of the fixed rail;
    a moving rail having a lower end configured to insert in the fixed rail through the rail slit, the moving rail configured to move forward and backward along the rail slit;
    a guide bracket coupled to the fixed rail to cover the fixed rail and having a bracket slit elongated along a longitudinal direction of the guide bracket and connected to the rail slit;
    a rail gap cover combined with the moving rail, fitted in the rail slit and the bracket slit, and configured to move with the moving rail; and
    a slit cover combined with the rail gap cover, configured to move with the moving rail and the rail gap cover, and supported by the guide bracket to keep closing the bracket slit when moving,
    wherein a guide groove having an elliptical track shape along the guide bracket is formed in the guide bracket, and
    the rail gap cover and the slit cover are inserted in the guide groove and configured to move along the guide groove.

2. The seat rail of claim 1, wherein the guide bracket includes a left bracket and a right bracket combined to cover an outer side of the fixed rail, and
    the bracket slit is open upward and formed by assembly of the left bracket and the right bracket.

3. The seat rail of claim 1, wherein a first plurality of inwardly protruding bracket bosses and a second plurality of inwardly protruding bracket bosses are formed at a front end of the guide bracket and a rear end of the guide bracket, respectively, and
    the first plurality of inwardly protruding bracket bosses and the second plurality of inwardly protruding bracket bosses are in contact with a front end of the fixed rail positioned inside the guide bracket and a rear end of the fixed rail positioned inside the guide bracket, respectively, thereby fixing a position of the fixed rail in a front-rear direction of the vehicle.

4. The seat rail of claim 1, wherein:
    the guide groove includes:
        an upper groove straightly elongated along the longitudinal direction of the guide bracket and formed at an upper portion of the guide bracket where the bracket slit is formed,
        a lower groove formed in parallel with the upper groove under the upper groove, and
        connection grooves formed in arc shapes,
    the connection grooves include:
        a front connection groove connecting a front end of the upper groove and a front end of the lower groove, and
        a rear connection groove connecting a rear end of the upper groove and a rear end of the lower groove.

5. The seat rail of claim 4, wherein the rail gap cover is disposed in the upper groove, such that the rail gap cover is movable forward and backward along only the upper groove.

6. The seat rail of claim 4, wherein the slit cover is disposed in all of the upper groove, the lower groove, and the connection grooves to be guided, such that the slit cover is movable along the guide groove.

7. The seat rail of claim 1, wherein:
    a first plurality of flange holes are formed through a left side of the guide bracket and spaced apart from each other in the longitudinal direction of the guide bracket, a second plurality of flange holes are formed through a right side of the guide bracket and spaced apart from each other in the longitudinal direction of the guide bracket, and a first plurality of rail flanges of the fixed rail and a second plurality of rail flanges of the fixed rail are respectively positioned outside through the first plurality of flange holes and the second plurality of flange holes.

8. The seat rail of claim 1, wherein the rail gap cover includes a left cover and a right cover that are combined with each other to cover a lower portion of the moving rail.

9. The seat rail of claim 1, wherein:
the rail gap cover includes a first guide protrusion and a second guide protrusion,
the first and second guide protrusions are both inserted in the guide groove and configured to move along the guide groove, and
the first and second guide protrusions laterally protrude from a left side of the rail gap cover and a right side of the rail gap cover, respectively.

10. The seat rail of claim 1, wherein:
cover flanges are formed at a lower end of the rail gap cover, and
the cover flanges are in contact with a bottom of the rail slit and restrict an upward movement of the rail gap cover.

11. The seat rail of claim 1, wherein:
a first end of the slit cover is fixed to a first coupling portion protruding from a front part of the rail gap cover, and
a second end of the slit cover is fixed to a second coupling portion protruding from a rear part of the rail gap cover, whereby the rail gap cover and the slit cover are connected in an elliptical track shape.

12. The seat rail of claim 1, wherein a wiring hole is formed at the rail gap cover to pass a wiring that is connected to electric parts of a seat.

13. The seat rail of claim 1, wherein the slit cover includes:
upper covers composed of a plurality of pieces, the plurality of pieces defining a curve, disposed in series, exposed through the bracket slit, and covering the bracket slit,
cover rubbers coupled to rear sides of the upper covers and connecting the upper covers, and
cover hinges coupled to the cover rubbers and protruding left and right,
wherein a first end of the upper covers and a second end of the upper covers are respectively coupled to a front end of the rail gap cover and a rear end of the rail gap cover, whereby the rail gap cover and the slit cover are connected in an elliptical track shape.

14. The seat rail of claim 13, wherein a left end of the cover hinges and a right end of the cover hinges are inserted in the guide groove and are movable along the guide groove.

15. The seat rail of claim 13, wherein the upper covers are made of a hard injection-molded material.

16. The seat rail of claim 1, wherein the rail gap cover is configured to cover a left gap between the moving rail and the bracket slit and a right gap between the moving rail and the bracket slit, and
the slit cover is configured to cover the fixed rail and the bracket slit.

* * * * *